United States Patent [19]

Huang

[11] 4,440,798

[45] Apr. 3, 1984

[54] LOW COST TEXTURIZED VEGETABLE PROTEIN

[75] Inventor: Emil A. Huang, Fridley, Minn.

[73] Assignee: Nabisco Brands, Inc., Parsippany, N.J.

[21] Appl. No.: 453,578

[22] PCT Filed: Apr. 29, 1981

[86] PCT No.: PCT/US81/00568

§ 371 Date: Nov. 8, 1982

§ 102(e) Date: Dec. 29, 1982

[87] PCT Pub. No.: WO82/03750

PCT Pub. Date: Nov. 11, 1982

[51] Int. Cl.$^3$ .............................................. A23J 3/00
[52] U.S. Cl. ................................... 426/656; 426/517; 426/802; 426/431
[58] Field of Search ............... 426/104, 656, 517, 429, 426/430, 431, 802

[56] References Cited

U.S. PATENT DOCUMENTS

| | | | |
|---|---|---|---|
| 3,142,571 | 7/1964 | Mc Anelly | 426/431 X |
| 3,488,770 | 1/1970 | Atkinson | 426/802 X |
| 3,870,805 | 3/1975 | Hayes et al. | 426/656 |
| 3,904,775 | 9/1975 | Harwood et al. | 426/802 X |
| 3,911,157 | 10/1975 | Bates et al. | 426/802 X |
| 3,973,044 | 8/1976 | Giddey et al. | 426/656 X |
| 4,133,901 | 1/1979 | Fetzer et al. | 426/802 X |
| 4,287,219 | 9/1981 | Fabre | 426/656 X |

*Primary Examiner*—Robert A. Yoncoskie
*Attorney, Agent, or Firm*—Gerald Durstewitz; Richard Kornutik

[57] ABSTRACT

A textured protein product having a protein content of up to 80% is produced by mixing soy meal (grits, flakes or flour) with water containing a protein insolubilizing agent to prepare a homogeneous mass; forming from said mass discrete pieces of a desired configuration under temperature and pressure conditions which retain the proteins in the undenatured state and retain the protein and carbohydrate molecules thereof substantially in the original matrix relationship of the starting material; and cooking the pieces in water in order (1) to denature the proteins in situ whereby contiguous protein molecules interlock to form a three dimensional network structure throughout each of the pieces, and (2) to leach out soluble carbohydrates from within the protein structure.

12 Claims, No Drawings

LOW COST TEXTURIZED VEGETABLE PROTEIN

BACKGROUND OF THE INVENTION

The present invention relates to the production of edible, low cost, bland tasting, high protein textured vegetable products derived from proteinaceous plant materials, such as soybeans, peanuts, and other legumes and nuts, which products resemble animal tissue when hydrated.

The recent widespread interest in textured vegetable products was generated to a large extent by the hope that such products could solve the problem of low protein diets in the undeveloped countries of the world. Experience had shown that in many of these areas the people would not accept protein rich legumes in their natural state, either whole or in meal form. To them beans and the like were the food of the food and where looked down upon. In such areas, meat is the food of the wealthy, a status food desired by everyone. Therefore texturized vegetable protein products were developed to provide a high protein food source which would look, chew and taste like meat and therefore would be accepted by the people.

Paradoxically, the previous commercial processes for producing texturized vegetable protein products were not suited to the conditions which exist where the food is needed. The equipment is quite expensive and complex and requires substantial electrical energy. As a result, the cost of such products, while considerably less than that of meat, was still too high for the great majority of people in the developing countries.

Even these prices could be achieved only when the high intitial equipment cost was spread over a high production volume. The high energy needs dictated that these processes could be carried out only in industrialized areas and therefore an extensive distribution system would be required to get the products to those people who needed it most. These processes could not be practiced on a small scale within remote villages where the only energy sources might be manual labor and a cook stove.

As a result, texturized vegetable protein is now produced almost exclusively as a lower cost meat substitute for sale in the protein-rich, developed areas of the world. Its function is not to supply protein to a deficient population, but to reduce the cost of protein to a well fed population.

Most of the textured vegetable protein products which have been commercially made in the past have been made by three general procedures. Each of these procedures utilize equipment which is expensive and requires a sophisticated source of electrical power. In the first procedure, protein isolates are produced and these isolates are extruded and spun into fibers. The fibers are formed into pieces or bundles by use of a suitable binder material to form meat-like chunks having a protein content of up to about 90%. An example of this procedure is found in U.S. Pat. No. 3,118,959.

In the second procedure the proteinaceous vegetable material, in meal form, is compacted in a high pressure extruder and the extrudate is broken into chunks. These chunks have a meat-like texture when hydrated in boiling water. An example of this process is disclosed in U.S. Pat. No. 4,057,656. At this stage, the product has the same protein content as the starting vegetable protein material. The protein content of this product can be increased by subjecting the chunks to hot or boiling water for about 1½ hours to dissolve out soluble carbohydrates. An example of a process including the protein concentrating step is disclosed in U.S. Pat. No. 3,912,824.

In the third commercial procedure, for forming textured vegetable protein, proteinaceous vegetable material, such as soy meal, is mixed with water to form a dough. This dough is extruded under high pressure and heat to produce an expanded product having a lattice network structure. An example of this type of procedure is given in U.S. Pat. No. 3,940,495 wherein the pH of the dough is controlled within the range of 5 to 12 to achieve a satisfactory fibrous structure in the expanded product. This type of procedure produces a product of up to about 50% protein if soy meal is used as the starting material. To produce products of higher protein content, a soy concentrate (70% protein) or soy isolate (90% protein) can be mixed with the soy meal.

A soy concentrate is made by either (1) treating the soy meal with an aqueous solution of an organic solvent which dissolves out soluble carbohydrates, or (2) mixing the soy meal with many times its weight of an aqueous acid solution having a pH in the minimum protein solubility range of 4-5 to leach out soluble carbohydrates, or (3) mixing the soy meal with many times its weight of an aqueous solution containing alkaline earth cations to leach out soluble carbohydrates without dissolving the proteins.

Each of the aforementioned commercial texturing procedures has a relatively high energy requirement. This is particularly true for those products which have an enhanced protein content. To produce such products by the previous commercial procedure requires that two separate processes be used. One process is necessary to enhance protein content and a second process is required to produce texturization. When the protein concentration is achieved before texturization, the starting material is processed to produce soy isolate or concentrate and the isolate or concentrate is texturized by a second process. When the starting material is texturized first, a high pressure extruder-compactor is used to produce texturized chunks, and the chunks of the compacted material must then be subjected to extended cooking to leach out carbohydrates.

SUMMARY OF THE INVENTION

Accordingly, it is an object of the present invention to provide a low cost textured vegetable protein product.

Another object is to provide a process for making such a product in which the starting vegetable protein material is simultaneously texturized and its protein content enhanced.

Another object is to provide such a process in which the step for forming the product pieces has a low energy requirement.

Another object is to provide such a process which can be carried out with low cost manually operated equipment and a cook stove.

The foregoing objects are accomplished by mixing the starting protein material in meal form with water to form a homogeneous mass, forming from said mass discrete pieces of a desired configuration under low pressure and low temperature conditions to maintain the proteins in their natural state and retain the protein and carbohydrate molecules substantially in the matrix relationship of the proteinaceous vegetable material, and cooking the pieces in water in the presence of a protein insolubilizing agent added with the water used to form the homogeneous mass or added to the cooking water in order (1) to denature proteins in situ to form a three dimensional protein network structure throughout each of the pieces, and (2) to leach out soluble carbohydrates from within the protein structure.

DESCRIPTION OF THE PREFERRED EMBODIMENTS

According to the present invention the proteinaceous vegetable material used may be soy beans, other beans, peanuts, other legumes, seeds, or nuts used in meal form. The term "meal" as used herein in both the specification and the claims includes grits, flakes, flours and the like. The proteinaceous meal may be a full fat meal or it may be one in which the fat has been removed, for example, by solvent extraction. The meal must be subjected to only minimal heat during its preparation so that the proteins remain in a substantially undenatured state. When soy meal is used, the protein dispersibility index should be 30 or higher.

In the method of the present invention, the proteinaceous meal is mixed with a small amount of water, the water representing between 10–75% by weight of the total mixture, to form a homogeneous mass. This mass may consist of individually identifiable moist meal particles, or it may have a dough-like consistancy, depending on the fineness of the meal and the amount of water used. The mixing is accomplished in any conventional mixer or blender such as those used in the baking industry for mixing baked goods doughs or those used in the home. Either electric or manually powered units can be used.

The homegeneous mass is formed into pieces of a desired shape by means of a low shear forming device. The term "low shear forming device" as used herein identifies those forming devices which subject the homogeneous mass to pressures and temperatures which do not cause the proteins to denature and do not substantially change the protein and carbohydrate matrix relationship which naturally exists in the proteinaceous material. Such formers include flaking rolls, dough sheeting rolls, embossing rolls such as shredding rolls which form dough strands, and low pressure extruders such as meat grinders and pasta extruders. These devices may be electrically or or manually powered. Where continuous strips, strands, or sheets are formed by these devices, and strips, strands or sheets are cut into pieces of desired length or shape, as appropriate. Where flaking rolls are used in conjunction with a coarse meal, the pieces formed are in flake form.

During the forming operation, the meal particles are pasted together or flattened, or both, and some of the protein molecules in the particules are thus placed in new contiguous relationships with other protein molecules. The ability of these formed pieces, (which at this point have a soft plastic or dough-like consistency) to be converted into a piece with meat-like consistency during the subsequent cooking step in contingent upon the presence therein of a high proportion of undenatured protein molecules.

As a protein molecule undergoes denaturation it interlocks with contiguous protein molecules which are also undergoing denaturation. Any proteins in the formed pieces which were previously denatured have exhausted their ability to bond with other proteins. They cannot therefore participate in providing the interlocking protein network necessary to produce a structure with meat-like strength characteristics.

The pieces are now cooked in water in the presence of a protein insolubilizing agent to denature the proteins in situ so that the continguous protein molecules become interlocked to form a three dimensional protein network structure extending throughout each of the pieces. The protein insolubilizing agent is present in sufficient quantity to prevent the protein molecules from dissolving, leaching out, or migrating before or during the denaturation of the proteins. Simultaneously with the denaturation of the proteins, soluble carbohydrates are leached out of the pieces. The extent of the carbohydrate removal is dependent at least in part, upon the dimensions of the pieces and cooking time. Thinner pieces are naturally more susceptible to the rapid dissolving out of the soluble carbohydrates. The cooking treatment is carried out in water that is at least 60° C.

Thin pieces will texturize instantaneously. Larger pieces require more time, up to 30 minutes, depending on the dimensions of the pieces. A cooking time of at least 5 minutes at boiling temperature (longer at lower temperatures) is recommended to inhibit anti-nutritional factors such as tryspin inhibitors which occur naturally in some proteinaceous vegetable materials. The quantity of cooking water is from 10 to 15 times, by weight, of the quantity of the formed pieces.

The protein insolubilizing agent may be added in the first or mixing step, that of forming the homogeneous mass, or it may be dissolved in the cooking water. Two types of insolubilizing agents may be employed. One type renders the proteins insoluble by adjusting the pH of the solution in contact with the protein molecules during cooking, to the range of minimum solubility of proteins. These insolubilizing agents include organic acids such as acetic, citric, lactic, malic, and the like, and mineral acids such as phosphoric, hydrochloric, nitric, sulfuric, and the like. These acidic agents can be dissolved in the water added in the mixing step or they can be dissolved in the cooking water. For soy meal the pH range of minimum solubility is generally between 2 and 5.5.

The second type of protein insolubilizing agent are the protein coagulating salts. These salts include organic and inorganic alkaline earth salts such as calcium chloride, calcium sulfate, magnesium chloride, magnesium sulfate, barium chloride, barium sulfate, calcium acetate, calcium lactate, calcium citrate, other alkaline earth salts or organic acids, and other similar inorganic salts which supply alkaline earth cations. The coagulating salts are added in dry powder form to the protein material at the beginning of the mixing step are mixed therewith to evenly distribute the salt on the surfaces of the meal particles. The water is then added as the mixing continues.

The two types of protein insolubilizing agents can be used in combination, with the protein coagulating salt being added in the mixing step and the acidic agent being either added in the mixing step or added to the cooking water.

After cooking, the cooking water is removed and the cooked pieces may be washed one or more times to remove or neutralize any excess acid or alkaline earth salts.

The product is removed from the wash water and may be used as it is (for example by adding it to a food product being manufactured) or dried for subsequent use.

The dried finished product has a protein content of up to 80% depending on the starting material and the degree of carbohydrate leaching achieved. This product rehydrates very rapidly in hot or cold water yielding a product with a meat-like, chewy texture. These textured products maintain their integrity through extended boiling and through retorting in canning processes. Coloring (for example to simulate salmon, shrimp, beef, or ham) may be added in the mixing step and it penetrates the meal particles. As a result, the product pieces retain their coloration even after extended cooking. Flavorings and seasonings can be added after cooking, for example during rehydration.

As an alternate to cooking the product prior to its distribution to the consuming public, the formed uncooked pieces of dough-like consistency are dried and distributed with cooking instructions. Preferably the protein insolubilizing agent is present in the uncooked pieces, being added at the first mixing step. If the insolubilizing agent used is of the acid type, it also acts to preserve the dried uncooked product. However, the public could be instructed to add a protein insolubilizing agent, which could be supplied with the dried uncooked product, to the cooking water. Coloring and flavoring ingredients can also be provided with the uncooked product for addition to the cooking water.

The following examples illustrate but do not limit the invention.

EXAMPLE 1

100 lbs. (45.4 kg.) of defatted soy grits were mixed with 2.9 gallons (11 l.) of water containing 0.36 gallons (1.36 l.) of glacial acetic acid in a ribbon blender for 10 minutes. The grits were passed through flaking rolls separated by 0.005 inches (0.127 mm.) yielding 0.5–1 inch (1.25–2.54 cm.) flakes. The flakes were transferred to a 30 gallon (113 l.) steam kettle containing 20 gallons (76 l.) of boiling water. After 5 minutes, the cooking water was decanted. The resulting wet product had a chewy, meat-like texture. The cooked flakes were rinsed with 10 gallons (38 l.) of cold water, then after decanting the water, were oven dried at 110° C. (230° F.). The resulting dried flakes had a moisture content of 3%, and a protein content of 78.9%. This product hydrated instantly in hot or cold water. The rehydrated flakes retain their structural integrity and chew characteristics.

EXAMPLE 2

A product resembling chicken croquettes was prepared using the flakes prepared in Example 1. The ingredients used are listed in Table 1.

TABLE 1

| Ingredient | Amount (Grams) |
|---|---|
| Texture Flakes (Example 1) | 50 |
| Egg White Powder | 10 |
| Wheat Gluten | 5 |
| Salt | 0.9 |
| Dried Vegetables | 4.2 |
| Monosodium Glutamate | 0.6 |
| Modified Starches | 9.8 |
| Chicken Seasoning | 16.0 |
| Water | 200 |

The dry ingredients were blended. The water was gradually added with thorough mixing. The resulting dough was formed into patties, then was fried.

EXAMPLE 3

100 lbs. (45.4 kg.) or defatted soy grits were mixed with 6.0 gallons (22.7 l.) of water containing 262 ml. of concentrated hydrochloric acid in a ribbon blender. The mixture was passed through a meat grinder equipped with a ¼ inch (6.4 mm.) diameter die plate. The strands were cut into ⅛–½ inch (3.2–12.7 mm.) pieces. The pieces were transferred to a 30 gallon (113 l.) steam kettle containing 20 gallons (76 l.) of boiling water. After 10 minutes, the cooking water was decanted. Next, 10 gallons (38 l.) of cold water were stirred in and after 5 minutes was decanted. The cut strands were oven dried at 110° C. (230° F.). The protein content was 74.5%. This product had a chewy meat-like texture after hydration.

EXAMPLE 4

100 lbs. (45.4 kg.) of defatted soy grits were treated as in Example 3 except two pounds (0.91 kg.) of caramel color were added in with the 6.0 gallons (22.7 l.) of water. The finished product has a brown, cooked meat color and texture. The protein content of the product was the same as in Example 3.

EXAMPLE 5

A meat sauce was made with the product from Example 4. The ingredients are listed in Table 2.

TABLE 2

| Ingredient | Amount |
|---|---|
| Textured Product (Example 4) | 75 grams |
| Seasonings | 21 grams |
| Tomato Paste | 3 ozs. (85 g.) |
| Water | 350 ml. |

The water was brought to a boil and was added to a blend of the textured soy product of Example 4 and the seasonings. When the mixture was well blended, the tomato sauce was added and the preparation was simmered for 5 minutes. The resulting sauce was comparable in taste and texture to a sauce made with fried chopped meat in place of the textured soy product.

EXAMPLE 6

100 lbs. (45.4 kg.) of soy grits were mixed with 1.00 lb. (454 g.) of CaSO$_4$. This mixture was well blended and 2.90 gallons (11 l.) of water were added. The mix was then blended and passed through dough-sheet rollers separated by 0.005 inches (0.127 mm.) to form a dough sheet. Ten of these sheets were stacked and the stack passed between rollers separated by 0.1 inches (2.5 mm.) to produce a laminated sheet. The laminated sheet was then cut into ¼ inch (6.4 mm.) by ¼ inch (6.4 mm.) sized particles and cooked in boiling water. After cooking for 15 minutes the water was decanted and fresh boiling water was added. The pieces were cooked for a total of 30 minutes, the cooking water being changed two more times. The pieces are then rinsed in cold tap water and then dried. The dry product had a protein content of 68.3%. The dried pieces rehydrated within about 5 minutes in cold water and about 3 minutes in hot water.

EXAMPLE 7

100 lbs. (45.4 kg.) of soy grits were mixed with 50 lbs. (22.7 kg.) of water containing 0.43 gallons (1.63 l.) of acetic acid (glacial). This mixture was well blended and passed through a pair of shredding type embossing rolls. The shredded strands were then cooked in the boiling water for 5 minutes. The cooked water was decanted and the cooked strands were rinsed with cold tap water before oven drying. Both the cooked strands and the rehydrated cooked strands retained their structural integrity and had chewy characteristics. The shredded strands made from the double shredding rolls resemble fibers and have a chewy texture after cooking in the boiling water. These double shredded strands have texture characteristics similar to spun protein fibers. The protein content of this product on a dry basis is 69.9%.

EXAMPLE 8

Example 7 was repeated with 1 lb. (454 g.) of $CaSO_4$ substituted for the acetic acid. The physical properties of the product were the same. The protein content was 64.4%.

EXAMPLE 9

100 lbs. (45.4 kg.) of soy grits were mixed with 2.9 gallons (11 l.) of water containing 0.36 gallons (1.36 l.) of lactic acid (80-88%). This mixture was well blended and went through dough sheeting rollers, with a separation of 1/32" (0.8 mm.). The soy sheeet was then stamped with different sized circular cutters to give an appearance like sliced pepperoni. The stamped pieces were cooked in boiling water for 15 minutes. The cooked pieces were then rinsed with cold tap water and oven dried. The protein content was 74.5%. The dried pieces were rehydrated in a solution containing flavoring, seasoning and coloring ingredients. The rehydrated pieces closely resembled meat in texture, appearance, flavor and taste.

EXAMPLE 10

0.97 pounds (440 g.) of defatted soy grits were well blended with 0.3 pounds of (136 g.) of calcium peroxide and then 0.2 liter of 0.5% acetic acid solution was mixed in. This mixture was passed through flaking rolls with a separation of 1/32" (0.8 mm.). The resulting soy flakes were cooked in boiling water for 5 minutes. The cooked pieces were rinsed with cold tap water and oven dried. The dried product had a protein content of 70.6%. The dried pieces rehydrated readily in either cold water or hot water and the rehydrated pieces closely resembled meat in texture and appearance.

The following table compares the cooking time and protein content for the products of examples 1, 3, 4 and 6 through 10. Examples 2 and 5 relate to combination of the end products of examples 1 and 4 with other ingredients and therefore are not included.

Defatted soy meal has a protein content on a dry basis of about 50%. It can be seen from the table, therefore, that with the method of the present invention substantial carbohydrate leaching is achieved during short periods of cooking.

| Example | Product Form | Cooking Time | Protein Content |
| --- | --- | --- | --- |
| #1 | flakes | 5 minutes | 78.9% |
| #3 & 4 | ¼" diameter | 10 minutes | 74.5% |
| #6 | strand pieces ¼" × ¼" chunks | 30 minutes | 68.3% |
| #7 | shredded strands | 5 minutes | 69.9% |
| #8 | shredded strands | 5 minutes | 64.4% |
| #9 | slices | 15 minutes | 74.5% |
| #10 | flakes | 5 minutes | 70.6% |

It will be seen from the foregoing that the present invention provides a process for making a low cost, high protein, textured vegetable protein product. This process has a low energy requirement in that the product pieces are formed at low temperature and low pressure, and a single short cooking step produces both texturization and protein content enhancement. The process is ideally suited to undeveloped areas, in that it can be carried out using low cost manually powered mixing and forming equipment and a cook stove of any type.

I claim:

1. The method of preparing a textured protein comprising the steps of:
   (a) mixing a meal of carbohydrate containing proteinaceous vegetable material with between about 10% and 75% water by weight of the total to form a homogeneous mass;
   (b) forming said mass under temperature and pressure conditions which retain the proteins therein in the undenatured state to obtain discrete pieces of a desired configuration having a dough-like consistency wherein a substantial portion of the protein molecules are in the undenatured state and the protein and carbohydrate molecules of said pieces are in substantially the original matrix relationship of the proteinaceous vegetable material; and
   (c) cooking said pieces to a meat-like consistency in water in the presence of at least one protein insolubilizing agent present in sufficient concentration to maintain the proteins insoluble in order (1) to denature the proteins in situ whereby contiguous protein molecules interlock to form a three dimensional protein network structure throughout each of the pieces, and (2) to leach out at least some carbohydrates from within the protein structure.

2. The method of claim 1 wherein said protein insolubilizing agent is added in step (a).

3. The method of claim 2 wherein said protein insolubilizing agent is selected from the class consisting of organic acids, mineral acids, and protein coagulating salts.

4. The method of claim 1 wherein said protein insolubilizing agent is added in step (c).

5. The method of claim 4 wherein said protein insolubilizing agent is selected from the class consisting of organic acids and mineral acids.

6. The method of claim 1 wherein said forming step is performed by a low shear forming device.

7. The method of claim 6 wherein said proteinaceous vegetable material meal is in grits form and wherein said low shear forming device is set of flaking rolls to produce discrete pieces in flake form.

8. The method of claim 6 wherein said forming step is performed by a low shear forming device selected from a class comprising low pressure extruders, dough sheeting rolls, and dough strand forming rolls, and wherein the forming step includes cutting the output of the forming device into pieces.

9. The method of claim 1 wherein step (c) is carried out with said pieces being cooked in water in the presence of two protein insolubilizing agents, one being a protein coagulating salt added in step (a) and the other an acid added in step (c).

10. The method of claim 3 wherein in step (a) a protein coagulating salt in dry powder form is dry mixed with the meal until uniform distribution is achieved before the water is added.

11. The method of claim 12 wherein the protein coagulating salt is an alkaline earth salt of an organic acid.

12. The method of claim 1 wherein two protein insolubulizing agents are present in step (c), an alkaline earth salt and an acid, the salt being added in step (a) in dry powder form before the addition of water.

* * * * *